(12) United States Patent
Guo

(10) Patent No.: US 10,208,707 B2
(45) Date of Patent: Feb. 19, 2019

(54) EFFICIENT THERMAL ENERGY POWER DEVICE AND WORK-DOING METHOD THEREFOR

(71) Applicant: Yuanjun Guo, Yongzhou (CN)

(72) Inventor: Yuanjun Guo, Yongzhou (CN)

( * ) Notice: Subject to any disclaimer, the term of this patent is extended or adjusted under 35 U.S.C. 154(b) by 5 days.

(21) Appl. No.: 15/323,959

(22) PCT Filed: Dec. 5, 2014

(86) PCT No.: PCT/CN2014/093118
§ 371 (c)(1),
(2) Date: Jan. 4, 2017

(87) PCT Pub. No.: WO2016/000400
PCT Pub. Date: Jan. 7, 2016

(65) Prior Publication Data
US 2017/0167436 A1 Jun. 15, 2017

(30) Foreign Application Priority Data

Jul. 4, 2014 (CN) .................. 2014 1 03140494

(51) Int. Cl.
*F02B 27/04* (2006.01)
*F02G 5/04* (2006.01)
*F01N 3/02* (2006.01)
*F01P 3/02* (2006.01)
*F01P 5/10* (2006.01)
*F02B 75/02* (2006.01)
(Continued)

(52) U.S. Cl.
CPC ............... *F02G 5/04* (2013.01); *F01N 3/02* (2013.01); *F01P 3/02* (2013.01); *F01P 5/10* (2013.01); *F02B 41/04* (2013.01); *F02B 47/00* (2013.01); *F02B 47/02* (2013.01); *F02B 75/021* (2013.01); *F02F 1/40* (2013.01); *F02F 7/0085* (2013.01); *F01P 2003/021* (2013.01); *F02B 2075/025* (2013.01); *F02B 2075/027* (2013.01); *Y02T 10/121* (2013.01)

(58) Field of Classification Search
CPC ...... F02G 5/04; F01N 3/02; F01F 1/40; F02F 7/0085; F01P 5/10
USPC .......................................................... 60/273
See application file for complete search history.

(56) References Cited

U.S. PATENT DOCUMENTS 4,552,106 A    11/1985   Ohl
8,661,816 B2 *  3/2014   Mathews .................. F01N 5/02
                                                              123/25 P

FOREIGN PATENT DOCUMENTS

CN        2781018 Y  *  5/2006
CN        1814997 A     8/2006
(Continued)

*Primary Examiner* — Jason D Shanske
(74) *Attorney, Agent, or Firm* — Gokalp Bayramoglu

(57) ABSTRACT

Disclosed is an efficient thermal energy power apparatus. A nozzle is arranged on a cylinder head of an internal combustion engine. The nozzle is connected to a pressure pump through a pipe. The pressure pump is connected to a liquid storage tank through a pipe. The liquid storage tank is connected to a cooler through a pipe, and the cooler is connected to an exhaust passage through a pipe. The advantages of the present invention are: a working stroke enables the temperature of a cylinder block to be lowered, and the compression ratio is high; due to being filtered by the cooler and the liquid storage tank, discharged exhaust gas is more environmentally friendly than that of existing engines.

7 Claims, 1 Drawing Sheet

(51) Int. Cl.
  *F02F 1/40*   (2006.01)
  *F02F 7/00*   (2006.01)
  *F02B 41/04*  (2006.01)
  *F02B 47/00*  (2006.01)
  *F02B 47/02*  (2006.01)

(56) References Cited

FOREIGN PATENT DOCUMENTS

| CN | 104088719 A | 10/2008 |
| CN | 101915147 A | 12/2010 |
| CN | 102031994 A | 4/2011 |
| CN | 103644030 A | 3/2014 |
| CN | 204082377 U | 1/2015 |

\* cited by examiner

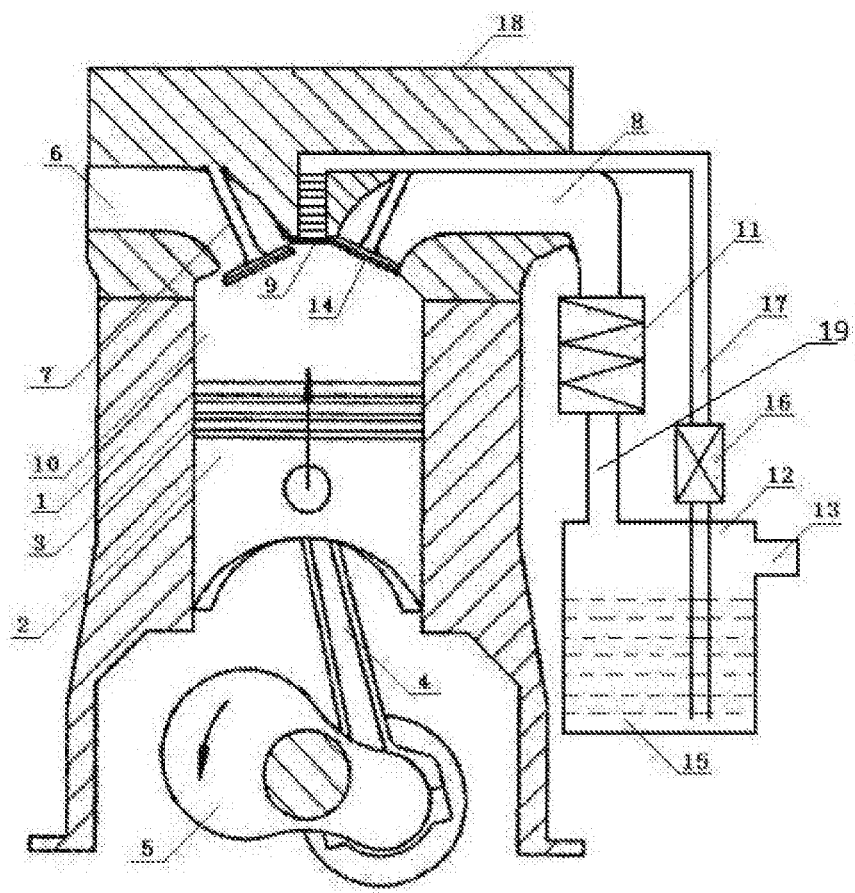

EFFICIENT THERMAL ENERGY POWER DEVICE AND WORK-DOING METHOD THEREFOR

TECHNICAL FIELD

The present invention relates to the field of thermal energy power apparatus, particularly the thermal energy power apparatus which uses the thermal energy of the internal combustion engine to convert into power energy.

BACKGROUND

Each working cycle of a four-stroke engine is composed of an intake stroke, a compression stroke, a working stroke, and an exhaust stroke. For a four stroke engine, in order to complete a working cycle, the piston in the cylinder needs to travel four times (i.e., the crankshaft turns twice). The four stroke engine is further divided into four-stroke gasoline engine and four stroke diesel engine. The main difference between these two kinds of the four-stroke engine is the ignition mode. The gasoline engine uses a spark plug ignition, while the diesel engine uses a compression ignition.

The four stroke engine belongs to the reciprocating piston engine, which can be divided into three types—a gasoline engine, a diesel engine, and a gaseous fuel engine according to different types of fuel being used. The reciprocating piston engine which uses gasoline or diesel as fuel is called the gasoline engine and the diesel engine respectively. The reciprocating piston engines that use natural gas, liquefied petroleum gas, and other gaseous fuel are called the gaseous fuel engine. Gasoline and diesel are both petroleum products, and are traditional fuels for the automobile engine. Non-petroleum fuel is called substitute fuel. The engine which uses the substitute fuel is called substitute fuel engine, such as ethanol engine, hydrogen engine, methanol engine etc.

In view of the heat balance of the current automobile engine, the power for power outputting generally accounts for only 30%-45% (diesel engine) or 20%-30% (gasoline engine) of the total heat of fuel combustion. The power which is discharged as residual heat out of the automobile accounts for 55%-70% (diesel engine) or 70%-80%, mainly including the heat taken away by recirculating cooling water and the heat taken away by exhaust gas. The following table is heat balance table of internal combustion engine.

| items of thermal balance % | gasoline engine | high-speed diesel engine | middle-speed diesel engine |
|---|---|---|---|
| heat of heat balance of effective work | 20-30 | 30-40 | 35-45 |
| heat taken away by coolant | 25-30 | 20-25 | 10-20 |
| heat taken away by exhaust gas | 40-45 | 35-40 | 30-40 |
| other heat loss | 5-10 | 5-10 | 10-15 |

The gasoline engine makes good mixture gas by mixing air with gasoline at a certain ratio. The mixture gas is inhaled into a cylinder during the intake stroke. Then the mixture gas is compressed and ignited to burn to generate heat energy. The gas with high temperature and high pressure is working on the top of the piston to push the piston to perform reciprocating linear motion, outputting mechanical energy to outside world through a connecting rod, a crankshaft, and a flywheel. The four-stroke gasoline engine accomplishes an intake stroke, a compression stroke, a working stroke, and an exhaust stroke within a working cycle.

Intake stroke: the piston is driven by the crankshaft to move from the top dead center (TDC) to the bottom dead center (TDC). An intake valve opens at the moment, an exhaust valve is closed, and a crankshaft rotates 180°. During the moving of the piston, the volume of the cylinder is gradually increased. The pressure of the gas in the cylinder is decreased from pr to pa to form a certain vacuum degree. Mixture gas of air and gasoline is inhaled into the cylinder through the intake valve, and is further mixed in the cylinder to form a combustible mixture gas. Since the intake system has resistance, at the intake end point, the pressure of the gas in the cylinder is less than atmospheric pressure 0p, that is, pa=(0.80-0.90) 0p. The temperature of the combustible mixture gas entered into the cylinder is increased to 340-400K, because the combustible mixture gas is heated by the intake pipe, the cylinder wall, the piston head, valves, the combustion chamber wall and other high-temperature parts, and is mixed with the residual exhaust gas.

Compression stroke: in the compression stroke, the intake valve and the exhaust valve are both closed. The piston moves from the BDC to the TDC, and the crankshaft rotates 180°. When the piston is moving upward, the working volume is reduced gradually. The pressure and the temperature of the mixture gas in the cylinder are constantly increased after the compression. When the compression end point is reached, the pressure pc of the mixture gas can reach 800-2000 kPa, and the temperature of the mixture gas reach 600-750K.

Working stroke: when the piston is close to TDC, the combustible mixture gas is ignited by the spark plug. The combustible mixture gas burns and releases a lot of heat, causing the pressure and temperature of the gas in the cylinder to increase rapidly. The maximum combustion pressure pZ reaches 3000-6000 kPa, and the temperature TZ reaches 2200-2800K. The gas with high temperature and high pressure pushes the piston moves from the TDC to the BDC, and outputs the mechanical energy to outside world through a mechanism of crank and connecting rod. With the piston moving downward, the volume of the cylinder is increased, and the pressure and temperature of the gas are reduced gradually. When b point is reached, the pressure of the gas is reduced to 300-500 kPa, the temperature is reduced to 1200-1500K. In the working stroke, the intake valve and the exhaust valve are both closed, and the crankshaft rotates 180°.

Exhaust stroke: in the exhaust stroke, the exhaust valve is open, and the intake valve is still closed. The piston moves from the BDC to the TDC, and the crankshaft rotates 180°. When the exhaust valve is open, on one hand, the burned exhaust gas is discharged out of the cylinder under the effect of the cylinder pressure difference between inside and outside. On the other hand, the burned exhaust gas is discharged out of the cylinder by the pushing-out effect of the piston. Due to the resistant effect of the exhaust system, the pressure at the exhaust end point r point is slightly more than the atmospheric pressure, that is, pr=(1.05-1.20) p0. The temperature of the exhaust end point is Tr=900-1100K. When the piston comes to the TDC, a certain volume of exhaust gas is left and can not be discharged. This part of the exhaust gas is called residual exhaust gas.

The four stroke diesel engine is similar to the gasoline engine. Each working cycle is also composed of an intake stroke, a compression stroke, a working stroke, and an exhaust stroke. Since the diesel engine uses diesel as fuel, compared with the gasoline, the diesel has a low self-ignition temperature, large viscosity, and is hard to volatilize. The diesel engine uses compression end self-ignition. The working process and system structure of the diesel engine is different from those of the gasoline engine.

Intake stroke: the working medium which enters the cylinder is pure air. Since the resistance of the intake system of the diesel engine is small, the pressure of the intake end point is pa=(0.85-0.95) p0, which is higher than that of the gasoline engine. The temperature of the intake end point is Ta=300-340K, which is lower than that of the gasoline engine.

Compression stroke: since the compressed working medium is pure air, the compression ratio of the diesel engine is higher than that of the gasoline engine (generally, ε=16-22). The pressure of the compression end point is 3000-5000 kPa. The temperature of the compression end point is 750-1000K, which is greatly more than the self-ignition temperature of the diesel (about 520 K).

Working stroke: when the compression stroke is approaching the end, under the effect of the high-pressure oil pump, the diesel is injected with a high pressure of about 10 Mpa to the combustion chamber of the cylinder. Upon mixed with the air in a short time, the diesel self-ignites and burns immediately. In the cylinder, the pressure of the gas increases rapidly, reaching up to 5000-9000 kPa. The highest temperature is 1800-2000K. Since the diesel engine self-ignites and burns under compression, the diesel engine is called compression ignition engine.

Exhaust stroke: the exhaust of the diesel engine is basically the same as that of the gasoline engine, only that the exhaust temperature is lower than that of the gasoline engine, generally, Tr=700-900K. As for the single-cylinder engine, the rotational speed is inhomogeneous, the working of the engine is unstable, and the vibration is severe. That is because only one stroke of the four strokes is working, while the other three strokes are the strokes that consume power to prepare for working. To solve this problem, the flywheel must have sufficiently rotational inertia, which will lead to increasing the weight and size of the whole engine. Using multi-cylinder engine can offset the above deficiency. Modern automobiles usually use the four-cylinder engine, the six-cylinder engine, and the eight-cylinder engine.

After the cylinder in the above internal combustion engine works, the temperature in the cylinder reaches above 1000K. The high-temperature gas is discharged through the exhaust valve, leading to the waste of the heat energy directly. The temperatures of parts like the inner wall of the cylinder, the piston head, the cylinder head, the valves, etc. are high, which will affect the efficiency of compression stroke. Thus, the cooling system is provided on all the cylinders of the existing engine.

Regarding the utilization of the exhaust gas of the engine, current engines may have a turbo boost. After boosting, the pressure and temperature of the engine are significantly increased during the working. Therefore, the lifetime of the engine will be shorter than that of the engine which has the identical emission without boosting. Furthermore, the mechanical performance and the lubrication performance are both affected. Thus, the application of the turbo boost technology in the engine is limited in a certain degree.

The utilization of the waste heat of the exhaust gas is low. An energy recovery device should resist to the vibration and the shock. The waste heat recovery device of the exhaust gas cannot affect the normal working performance of the engine. Currently, methods of using the exhaust gas waste heat of the engine mainly are the following types. An exhaust turbocharge uses a part of the energy of the exhaust gas to improve the intake pressure of the internal combustion engine to increase the volume of gas, to improve the power property and economy of the engine. Currently, quite a few automobiles use the method of the turbo boost. However, the method of the turbo boost can only employ a part of the energy of the exhaust gas. Furthermore, there are problems, for example, the whole working condition of the engine being hard to match and some other problems.

There are three methods of using of the exhaust gas of the engine to generate power, i.e., the thermoelectric power generation, the exhaust gas turbine power generation, and the Teflon turbine power generation. The thermoelectric power generation mainly uses thermoelectric power generation material to generate power. However, since the energy conversion rate of thermoelectric material is low, it is required that the thermoelectric conversion material with a high energy conversion rate should be developed. The exhaust gas turbine power generation uses the exhaust gas to drive the turbine to make the generator generate power. This method of power generation has certain influences on the performance of the engine, which needs further study. Currently, methods of using the waste heat of the exhaust gas of the engine to refrigerate mainly are absorption refrigeration and sorption refrigeration. The principle of the absorption refrigeration is that the heat is used as power to accomplish the refrigeration cycle. The sorption refrigeration uses properties of some solid materials, which can absorb a certain gas or steam at a certain temperature and pressure, and can release the gas or steam at another temperature and pressure, to realize refrigeration. According to the present situation of the utilization of the waste heat the exhaust gas of the engine at home and abroad, a concept of the method of using the waste heat of the exhaust gas of the engine to generate heat and power is provided.

The basic structure of the single-cylinder engine includes a cylinder, a piston, a connecting rod, a crankshaft, a cylinder head, a block, a camshaft, an intake valve, an exhaust valve, a valve spring, and a crankshaft toothed pulley, etc. The working chamber of the reciprocating piston engine is called a cylinder. The internal surface of the cylinder is cylindrical. The piston in the cylinder that performs reciprocating movement is hinged with one end of the connecting rod through a piston pin. The other end of the connecting rod is connected to the crankshaft to form the crank and connecting rod mechanism. When the piston performs reciprocating movement in the cylinder, the crankshaft is pushed by the connecting rod, or vice versa. At the same time, the volume of the cylinder is continuously changed from small to large, and then from large to small. The cycle is repeated continuously. The top of the cylinder is sealed with the cylinder head. The intake valve and the exhaust valve are mounted on the cylinder head. Through the opening and closing of the intake valve and the exhaust valve, the inflating of the gas into the cylinder and the discharging of the exhaust gas of the cylinder can be achieved. The opening and closing of the intake valve and the exhaust valve are driven by the camshaft. The camshaft is driven by the crankshaft through a toothed belt or a gear. The part which forms the cylinder is called the cylinder block. The crankshaft rotates in the crankcase.

Since the working medium does not burn, the external combustion engine avoids the knocking problem of working of the traditional internal combustion engine. Thus, the external combustion engine achieves a high efficiency, a low noise, a low pollution, and a low running cost. Once the heat chamber reaches 700° C., the apparatus can work and run immediately. The lower the environmental temperature is, the higher the efficiency of power generation is. The most remarkable advantage of the external combustion engine is the output and efficiency are not limited by the altitude, which is suitable to be used in high altitude areas.

At the same time, the main existing problems and defects of the Stirling Engine are as follows. The manufacturing cost is high. The sealing technology of working medium is difficult. The reliability and service life of the seal components have problems. The cost of the material is high. The power adjusting and controlling system are complicated. The machine is relatively bulky. The costs of the expansion chamber, the compression chamber, the heater, the cooling chamber, the regenerator, etc. are high. The heat loss is 2-3 times that of the internal combustion engine, etc.

Organic Rankine Cycle system includes a pump, an evaporator, an expander, a generator, a condenser, etc. The heat collector absorbs the solar irradiance, and the temperature of heat exchange medium in the heat collector is increased. The heat exchange medium transfers the heat to the organic medium through the evaporator. The organic medium is heated in the evaporator under a constant pressure. The gaseous organic medium with high pressure enters the expander to work to drive the generator to generate power. The organic medium which is discharged from the end of the expander enters the condenser to condense under a constant pressure. The organic medium from the exhaust passage of the condenser enters the evaporator after being compressed by the pump to accomplish a generation cycle.

Organic Rankine Cycle system has problems of low conversion efficiency, large volume, and requiring an expander which has a complex structure to work.

The existing engine has too much noise, especially, the multi-cylinder engine with a large emission.

SUMMARY

In the above Background, the utilization of exhaust gas in the prior art is all on the outside of the cylinder, which needs to configure a complete recycle system. The utilization of the waste heat of the exhaust gas is low. An energy recovery device should be vibration and shock resistant. The waste heat recovery device of the exhaust gas cannot affect the normal working performance of the engine. Currently, methods of using the exhaust gas waste heat of the engine mainly are the following types. An exhaust turbocharger uses a part of the energy of the exhaust gas to improve the intake pressure of the internal combustion engine to increase the volume of gas, to improve the power property and economy of the engine. Currently, quite a few automobiles use the method of the turbo boost. However, the method of the turbo boost can only employ a part of the energy of the exhaust gas. Furthermore, there are problems, i.e., the whole working condition of the engine is hard to match, etc. There are mainly three methods of using the exhaust gas of the engine to generate power, i.e., the thermoelectric power generation, the exhaust gas turbine power generation, and the Teflon turbine power generation. The thermoelectric power generation mainly uses thermoelectric power generation material to generate power. However, since the energy conversion rate of thermoelectric material is low, it is required that the thermoelectric conversion material with a high energy conversion rate should be developed. The exhaust gas turbine power generation uses the exhaust gas to drive the turbine to make the generator to generate power. This method of power generation has certain influences on the performance of the engine.

Currently, methods of using the waste heat of the exhaust gas of the engine to refrigerate mainly are the absorption refrigeration and the sorption refrigeration. The principle of the absorption refrigeration is that the heat is used as power to accomplish the refrigeration cycle. The sorption refrigeration uses properties of some solid materials, which can absorb a certain gas or steam at a certain temperature and pressure, and can release the gas or steam at another temperature and pressure, to realize refrigeration. According to the present situation of the utilization of the waste heat the exhaust gas of the engine at home and abroad, a concept of the method of using the waste heat of the exhaust gas of the engine to generate heat and power is provided.

The invention effectively utilizes technical characteristics that the cylinder itself of the internal combustion engine has high energy and the cylinder needs cooling and displacement. The structure of the internal combustion engine itself makes full use of heat, which makes heat energy generated by working to be used the second time to produce mechanical energy. The high cost of the expansion chamber, the compression chamber, the heater, the cooling chamber, the regenerator, etc. in the internal combustion engine is overcome. The heat loss which is 2-3 times that of the internal combustion engine and other problems are overcome. The technical problems that Organic Rankine Cycle system requires an expander or a gas turbine and that the manufacturing cost is high are also overcome.

The present invention provides a thermal energy power engine with high heat energy conversion and recyclable working medium, which can convert the heat generated by working inside the cylinder into mechanical energy again.

The present invention uses a technical solution that is: an efficient thermal energy power apparatus, characterized in that: a nozzle is arranged on a cylinder head of an internal combustion engine. The nozzle is connected to a pressure pump through a pipe. The pressure pump is connected to a liquid storage tank through the pipe. The liquid storage tank is directly connected to a cooler through a second pipe; the cooler is connected to an exhaust passage, and an exhaust port is located on the liquid storage tank.

Furthermore, the cylinder block and the cylinder head of the internal combustion engine are made from thermally conductive metal material.

The working method of the above efficient thermal energy power apparatus is as below. The air injection working stroke and the exhaust stroke of the working medium which is injected by the nozzle after compression and combustion in an existing engine is provided. That is, compression expansion and injected air work at the same time.

The six-stroke working method of the above efficient thermal energy power apparatus is as below. Each working cycle of the internal combustion engine includes an intake stroke, a compression stroke, a combustion work and an air injection stroke, and an exhaust stroke. When the internal combustion engine is going to achieve a working cycle, the piston in the cylinder needs to travel four times, that is, the crankshaft turns two circles.

In the above working method of the efficient thermal energy power apparatus, the internal combustion engine is a gasoline engine, a diesel engine, and a substitute gas engine; and it is the engine of two-stroke, four-stroke, six-stroke, or other-stroke engine, and the other-stroke engine is added with an air injection working stroke.

The air injection working stroke of the above working method of the efficient thermal energy power apparatus is as below. The working medium enters the combustion chamber through the nozzle of the cylinder head. The working medium absorbs the heat of the compression combustion to rapidly expand. The expanding of the working medium and the expanding of the combustion work on the piston at the same time and make the working efficiency increase by 20%-75%.

In an existing internal combustion engine, the compression and the expansion work, a large amount of heat generated from a combustion is displaced by the exhaust gas. The present invention uses the working medium which is injected instantly after the compression and the expansion to absorb 45%-95% of the high-temperature thermal energy from the, combustion such that the working medium is gasified and expands to work, which effectively uses the thermal energy. At the same time, it increases horsepower under the condition that the working of the internal combustion engine itself is not affected.

The advantages of the present invention are as below. The working stroke enables the temperature of a cylinder block to be lowered. The compression ratio is high. Since the discharged exhaust gas is filtered by the cooler and the liquid storage tank, discharged exhaust gas is more environmentally friendly than that of existing engines. The exhaust gas discharged after the temperature of the cylinder block has been lowered is filtered by the cooler and the liquid storage tank without noise. The combustion and the injection work simultaneously. The utilization rate of the thermal energy is increased by 20%-95%. The thermal energy utilization is performed directly within the cylinder block, and a heat dissipation water tank is not required.

BRIEF DESCRIPTION OF THE DRAWINGS

FIG. 1 is a structural diagram of the present invention.
In the FIGURE: 1. cylinder block; 2. piston; 3. piston ring; 4. connecting rod; 5. crankshaft; 6. inlet passage; 7. intake valve; 8. exhaust passage; 9. nozzle; 10. combustion chamber; 11. cooler; 12. liquid storage tank; 13. exhaust port; 14. exhaust valve; 15. working medium; 16. pressure pump; 17. pipe; 18. cylinder head; 19. a second pipe.

DETAILED DESCRIPTION OF THE EMBODIMENTS

With reference to the FIGURE, the detailed description of embodiments of the invention is as below.

An efficient thermal energy power apparatus comprises cylinder block 1, piston 2, piston ring 3, connecting rod 4, crankshaft 5, inlet passage 6, intake valve 7, exhaust passage 8, nozzle 9, combustion chamber 10, cooler 11, liquid storage tank 12, exhaust port 13, exhaust valve 14, working medium 15, pressure pump 16, pipe 17, cylinder head 18, a second pipe 19. Combustion chamber 10 and piston 2 are arranged in cylinder block 1. Piston ring 3 is arranged on piston 2. Piston 3 is movably connected to connecting rod 4. Connecting rod 4 is connected to crankshaft 5. Cylinder head 18 is arranged on the top portion of cylinder block 1. Inlet passage 6, exhaust passage 8, and nozzle 9 are arranged on the cylinder head 18. Intake valve 7 is arranged in inlet passage 6. Exhaust valve 14 is arranged in exhaust passage 8. Nozzle 9 is connected to pressure pump 16 through pipe 17. Pressure pump 16 is connected to liquid storage tank 12 through pipe 17. Liquid storage tank 12 is directly connected to cooler 11 through a second pipe 19. Cooler 11 is connected to exhaust passage 8. Exhaust port 13 is arranged on liquid storage tank 12. Working medium 15 is put into liquid storage tank 12. Pipe 17 which is within liquid storage tank 12 is extended to the bottom. Cylinder block 1 of the internal combustion engine is wrapped by a thermal insulation layer. The cylinder block and the cylinder head of the internal combustion engine are made from thermally conductive metal material of which thermal conductivity is over 300 W/m·K, preferred selecting an alloy made of gold, silver, and copper.

The described efficient thermal energy apparatus can be made into the single-cylinder engine, two-cylinder engine, and multi-cylinder engine. With different working medium, the utilization efficiency of thermal energy is different. The structure of the present invention can be designed to use in the gasoline engine, the diesel engine, and the substitute gas engine according to requirement.

What is claimed is:

1. An efficient thermal energy power apparatus, comprising:
a nozzle, arranged on a cylinder head of an internal combustion engine; the nozzle being connected to a pressure pump through a pipe; a single liquid storage tank having a top, a bottom, and sides extending from the top to the bottom, the pressure pump being connected to the top of the single liquid storage tank through the pipe; the top of the single liquid storage tank being directly connected to a cooler through a second pipe; the cooler being connected to an exhaust passage, and an exhaust port is located on one of the sides of the single liquid storage tank.

2. The efficient thermal energy power apparatus of claim 1, wherein a cylinder block and the cylinder head of the internal combustion engine are made of thermally conductive metal material.

3. The efficient thermal energy power apparatus of claim 1, wherein a cylinder block and the cylinder head of the internal combustion engine are made of thermally conductive metal material, thermal conductivity of the thermally conductive metal material being over 300 W/m·K.

4. A working method of an efficient thermal energy powder apparatus, comprising:
providing an air injection working stroke of a working medium injected from a nozzle and an exhaust stroke after a compression and a combustion in the efficient thermal energy power apparatus,
wherein a compression expansion and an air injection work at the same time;
wherein the efficient thermal energy power apparatus includes the nozzle which is arranged on a cylinder head of an internal combustion engine; the nozzle being connected to a pressure pump through a pipe; a single liquid storage tank having a top, a bottom, and sides extending from the top to the bottom, the pressure pump being connected to the top of the single liquid storage tank through the pipe; the top of the single liquid storage tank being directly connected to a cooler through a second pipe; the cooler being connected to an exhaust passage, and an exhaust port is located on one of the sides of the single liquid storage tank.

5. The working method of the efficient thermal energy power apparatus of claim 4, wherein the internal combustion engine is a gasoline engine, a diesel engine, or a substitute gas engine; and the internal combustion engine is a two-stroke engine, a four-stroke engine, six-stroke engine, or other-stroke engine, and the other-stroke engine is added with the air injection working stroke.

6. The working method of the efficient thermal energy power apparatus of claim 5, wherein the air injection working stroke is that the working medium enters a combustion chamber through the nozzle on the cylinder head; wherein the working medium absorbs heat of the compression combustion and expands rapidly; an expanding of the working medium and an expanding of the combustion take effect on a piston at the same time, making a working efficiency increase by 20%-75%.

7. The efficient thermal energy power apparatus of claim 3, wherein the thermally conductive metal material is selected from the group consisting of gold, silver and copper.

* * * * *